United States Patent [19]
Murata et al.

[11] Patent Number: 5,588,052
[45] Date of Patent: Dec. 24, 1996

[54] DTMF SIGNAL JUDGING APPARATUS

[75] Inventors: Yasumoto Murata, Nara-ken; Michio Ikeuchi; Shuichi Yoshikawa, both of Nara; Masahiko Watanabe, Yamatokoriyama, all of Japan

[73] Assignee: Sharp Kabushiki Kaisha, Osaka, Japan

[21] Appl. No.: 384,613

[22] Filed: Feb. 3, 1995

Related U.S. Application Data

[63] Continuation of Ser. No. 978,742, Nov. 19, 1992, abandoned.

[30] Foreign Application Priority Data

| Nov. 19, 1991 | [JP] | Japan | 3-303402 |
| Dec. 27, 1991 | [JP] | Japan | 3-347312 |
| Jan. 27, 1992 | [JP] | Japan | 4-012275 |
| Feb. 10, 1992 | [JP] | Japan | 4-024108 |

[51] Int. Cl.$^6$ .................................. H04M 1/515
[52] U.S. Cl. .................................. 379/283; 379/386
[58] Field of Search .................................. 379/386, 283, 379/351, 77, 100

[56] References Cited

U.S. PATENT DOCUMENTS

| 4,042,790 | 8/1977 | Richards | 379/283 |
| 4,091,243 | 5/1978 | Mizrahi | 379/283 |
| 4,191,862 | 3/1980 | Hughes | 379/283 |
| 4,922,528 | 5/1990 | Hubert | 379/283 |
| 5,117,369 | 5/1992 | Yoshikawa . | |
| 5,119,322 | 6/1992 | Stroobach | 364/724.09 |
| 5,214,693 | 5/1993 | Chujo | 379/283 |

Primary Examiner—Krista M. Zele
Assistant Examiner—Thomas F. Presson

[57] ABSTRACT

A DTMF signal judging apparatus includes a first power calculator, and second power calculator and a judging apparatus. The first power calculator calculates the overall power of an input signal or the power of the input signal outside the DTMF frequency band. The second power calculator calculates the power in the DTMF frequency band; or more specifically, calculates the power in both the higher and lower frequency band portions of the DTMF frequency band. The judging apparatus then compares the output from the first and second calculators, and determines whether the input signal is a DTMF signal based on the comparison.

12 Claims, 10 Drawing Sheets

DTMF SIGNAL JUDGING APPARATUS

This application is a continuation of application Ser. No. 07/978,742 filed on Nov. 19, 1992, now abandoned.

BACKGROUND OF THE INVENTION

1. Field of the Invention

The present invention relates to an apparatus for judging a DTMF (dual-tone multifrequency) signal used in a facsimile machine, a multifunctional telephone, or the like.

2. Description of the Related Art

In DTMF pulsing (telephone switching systems), a simultaneous combination of one of a lower group of frequencies and one of a higher group of frequencies to represent each digit or character is utilized. A DTMF signal is a signal used to transmit a telephone number, etc. from a push-button telephone or the like to a telephone exchange. Recently, a DTMF signal has also come to be used for transmission and reception of information after establishing a connection between telephones. Therefore, some facsimile machines and multifunctional telephones for connection to a public switched telephone network are equipped with a DTMF receiver.

In DTMF pulsing (telephone switching systems), one of four lower frequency tones is combined with one of four higher frequency tones. In telephone switching systems, a tone is an audible signal transmitted over the telecommunications network. The following four frequencies $f_a$ to $f_d$ are allocated to the tones of the lower frequency group.

$f_a$=697 Hz $f_b$=770 Hz $f_c$=852 Hz $f_d$=941 Hz

The following four frequencies $f_e$ to $f_h$ are allocated to the tones of the higher frequency group.

$f_e$=1209 Hz $f_f$=1336 Hz $f_g$=1477 Hz $f_h$=1633 Hz

For example, the DTMF signal representing the dial number "1" is composed of a combination of tone frequencies of 697 Hz and 1209 Hz. An exemplary frequency spectrum of a DTMF signal is shown in FIG. 10.

FIG. 9 shows an exemplary conventional DTMF receiver. The DTMF receiver of FIG. 9 includes eight band-pass filters 110 to 117 which are connected to an input terminal 100. Each band-pass filter corresponds to one of the above-mentioned eight tone frequencies $f_a$ to $f_h$. In each band-pass filter, the center frequency of the pass band is set so as to be equal to the corresponding tone frequency. Connected to the band-pass filters are multipliers 120 to 127 by which the intensities of the output signals from the band-pass filters 110 to 117 are squared, respectively. The multipliers 120 to 127 are connected to smoothing low-pass filters 130 to 137, respectively. The output signals from the smoothing low-pass filters 130 to 137 are supplied to level detectors 140 to 147, respectively. The output signals from the level detectors 140 to 147 are input to a coder 150. The coder 150 outputs a code indicating that a DTMF signal has been entered, based on the output signals from the level detectors 140 to 147.

A signal other than a DTMF signal (such as a voice signal or a signal of a white noise, etc.) may be input to the DTMF receiver. The input signal may include tone frequencies of a DTMF signal. Accordingly, even when a signal which is not a DTMF signal is input, the DTMF receiver erroneously outputs a code indicating that a DTMF signal has been entered. This erroneous output code from the DTMF receiver prevents a system which utilizes the DTMF receiver from properly operating.

SUMMARY OF THE INVENTION

The DTMF signal judging apparatus of this invention comprises: first means for calculating the power of a signal in a certain frequency band of an input signal; second means for extracting a signal having a frequency in a DTMF detection frequency band from the input signal, and for calculating the power of the extracted signal; and third means for performing an operation for the signals output from the first and second means, for comparing the operation result with a predetermined threshold value, and for outputting the compared result.

The function of the DTMF signal judging apparatus of the invention which is connected to a DTMF receiver is outlined below. A signal input into the DTMF receiver is also input into the DTMF signal judging apparatus in an embodiment of the invention. The power of a signal in a certain frequency band of the input signal and the power of a signal in the DTMF detection frequency band of the input signal are respectively obtained by processing. The power in the certain frequency band and the power in the DTMF detection frequency band are further processed. The processed result is compared with a predetermined threshold value. By this comparison, a judge result signal indicating that the processed result is larger than or equal to the predetermined threshold value or indicating that the processed result is smaller than the threshold value is output from the DTMF signal judging apparatus of the embodiment. The judge result signal represents that the signal input into the DTMF receiver is a DTMF signal or another signal. An apparatus which receives the judge result signal detects whether the signal input into the DTMF receiver is a DTMF signal or some other signal.

Thus, the embodiment described herein makes possible the advantage of providing a DTMF signal judging apparatus for judging whether an input signal is a DTMF signal or not, whereby a system with the DTMF receiver is prevented from erroneously operating even when a signal other than a DTMF signal is input into the DTMF receiver.

This and other advantages of the present invention will become apparent to those skilled in the art upon reading and understanding the following detailed description with reference to the accompanying figures.

DESCRIPTION OF THE PREFERRED EMBODIMENTS

Embodiments of the invention will be described below. In the specification, four embodiments of the invention are described.

Example 1

Figure 1:
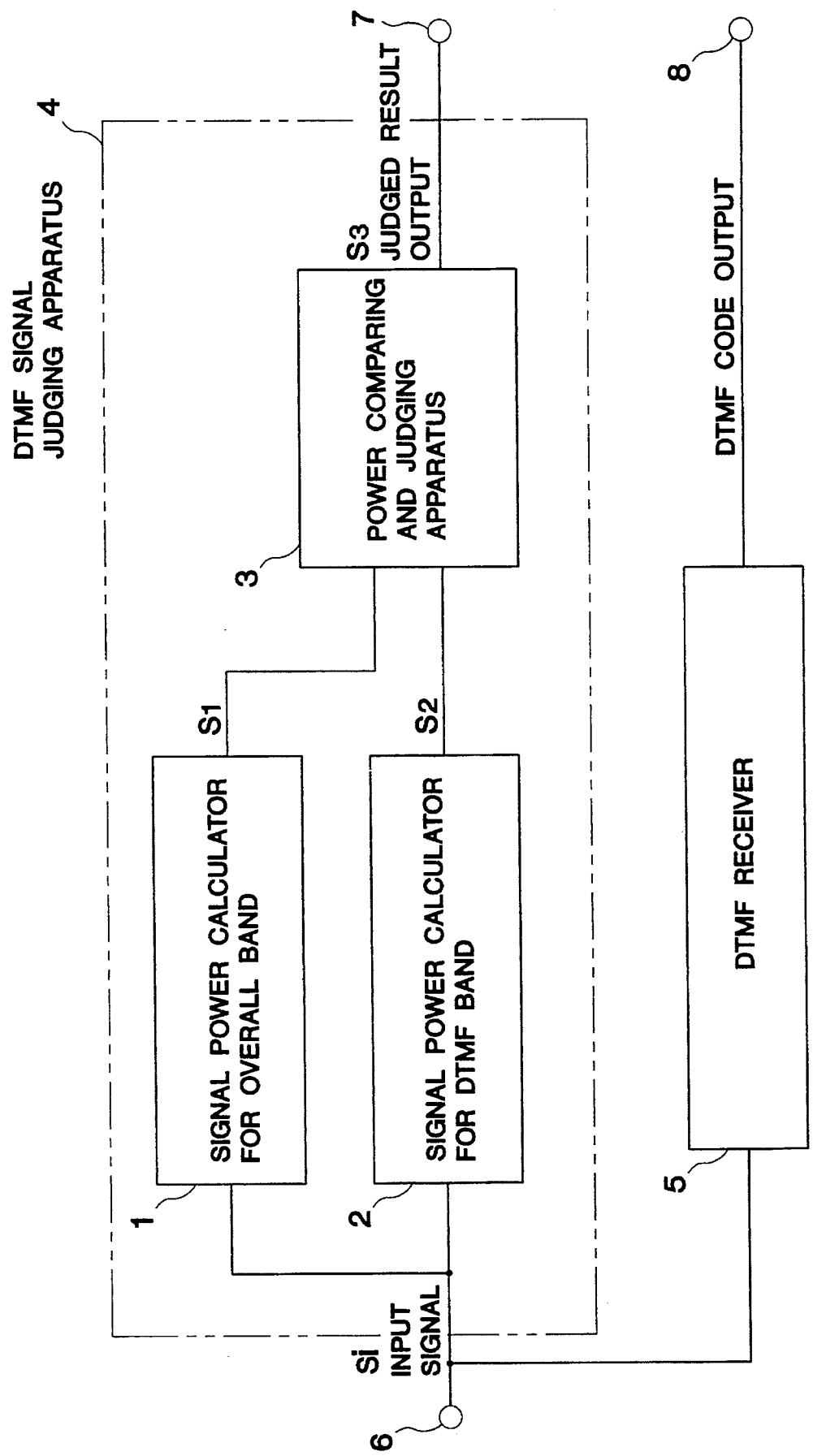
FIG. 1 is a block diagram showing a DTMF signal judging apparatus according to a first example of the invention.
Figure 2:
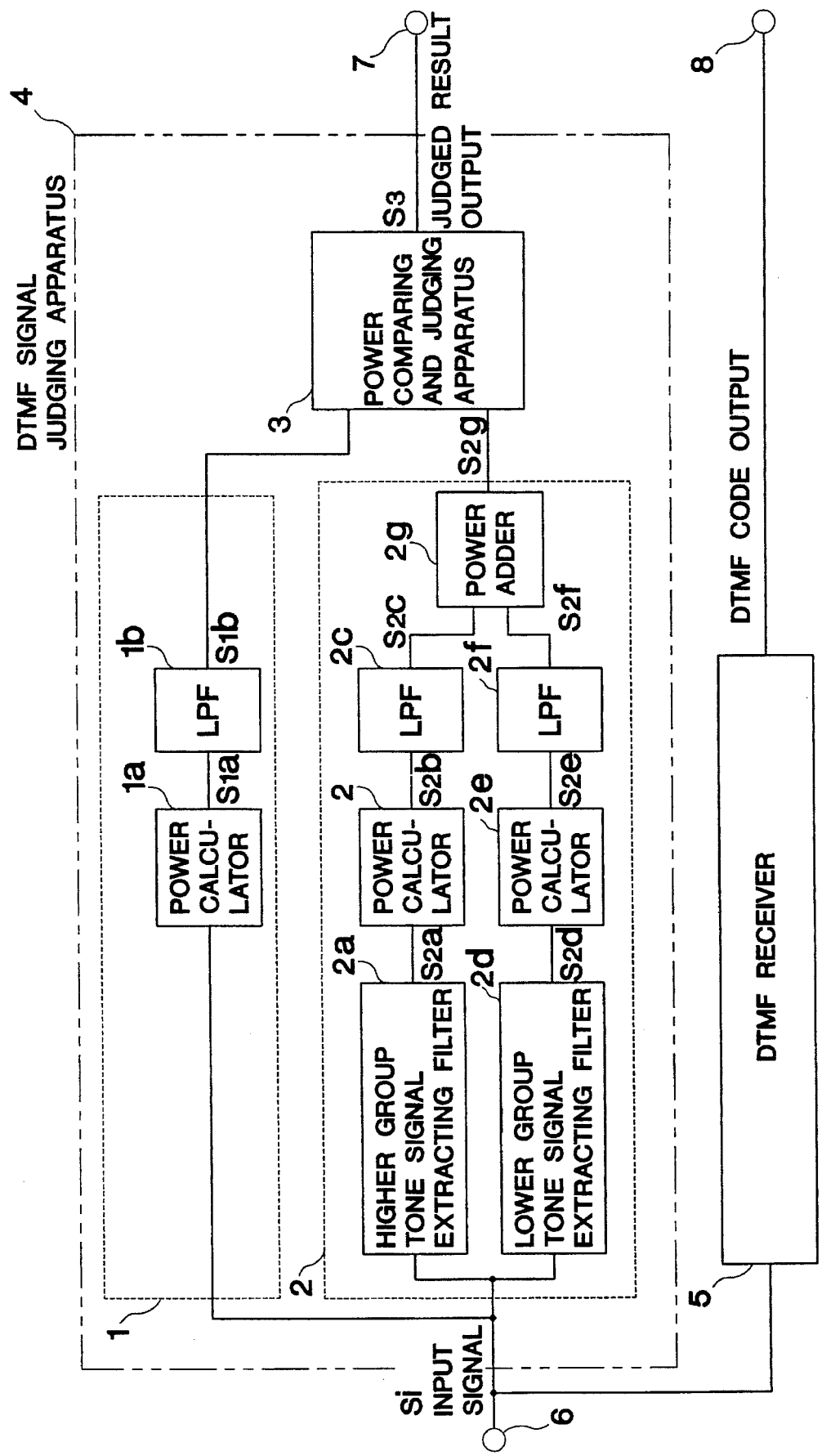
FIG. 2 is a block diagram showing the DTMF signal judging apparatus of FIG. 1 in detail.

A first example of the invention is described with reference to FIGS. 1 and 2. FIG. 1 is a block diagram showing a DTMF signal judging apparatus in the first example of the invention which is connected to a DTMF receiver. FIG. 2 is a block diagram showing the DTMF signal judging apparatus of FIG. 1 in detail.

A DTMF signal judging apparatus 4 in this example includes a signal power calculator 1 for a signal in a certain frequency band, for example, for a signal in the overall frequency band, a signal power calculator 2 for a signal in a DTMF detection frequency band, and a power comparing and judging apparatus 3.

The signal power calculator 1 for the overall frequency band includes a power calculator 1a and a smoothing low-pass filter 1b. The signal power calculator 2 for the DTMF detection frequency band includes a signal extracting filter 2a for extracting a tone signal in a higher frequency group, a signal extracting filter 2d for extracting a tone signal in a lower frequency group, power calculators 2b and 2e, smoothing low-pass filters 2c and 2f, and a power adder 2g.

An input terminal 6 of a DTMF receiver 5 is connected to the power calculator 1a, the signal extracting filter 2a for the higher frequency group, and the signal extracting filter 2d for the lower frequency group. The outputs of the signal extracting filters 2a and 2d are connected to the power calculators 2b and 2e, respectively. The outputs of the power calculators 1a, 2b, and 2e are connected to the corresponding smoothing low-pass filters 1b, 2c and 2f. The output of the smoothing low-pass filter 1b is connected to the power comparing and judging apparatus 3 as one input thereof. The outputs of the smoothing low-pass filters 2c and 2f are both connected to the power adder 2g. The output of the power adder 2g is connected to the power comparing and judging apparatus 3 as the other input thereof. The output of the power comparing and judging apparatus 3 is connected to an output terminal 7. The output of the DTMF receiver 5 is connected to an output terminal 8.

An input signal Si received at the input terminal 6 of the DTMF receiver 5 is then input into the power calculator 1a, and the signal extracting filters 2a and 2d, respectively.

The power calculator 1a squares the intensity of the signal in the overall frequency band of the input signal Si, so as to obtain the power of the signal. For example, the input signal is input into an analog-to-digital convertor via a sample and hold circuit. As a result, the input signal is converted into a digital signal. A value indicated by the digital signal is squared. A digital signal indicating the squared result is output to a digital-to-analog convertor which in turn outputs a power signal S1a as the calculated result to the smoothing low-pass filter 1b. In the same way, the power calculators 2b and 2e respectively output power signals S2b and S2e to the smoothing low-pass filters 2c and 2f. The smoothing low-pass filters 1b, 2c and 2f remove the high frequency signal of the power signals S1a, S2b and S2e, respectively, and smooth the power signals. The power signal S1b which has passed through the smoothing low-pass filter 1b is output to the power comparing and judging apparatus 3 as a signal having a value of the power of the signal in the overall band of the input signal Si which is input into the DTMF signal judging apparatus 4.

The signal extracting filter 2a extracts a tone signal in the higher frequency group of the DTMF detection frequency band from the input signal Si. The extracted tone signal S2a is input into the power calculator 2b. The power calculator 2b squares the intensity of the signal S2a, so as to obtain the power thereof as described above. The power signal S2b of the higher frequency group is output to the smoothing low-pass filter 2c. The power signal S2c which has passed through the smoothing low-pass filter 2c is output to the power adder 2g.

The signal extracting filter 2d extracts a tone signal in the lower frequency group of the DTMF detection frequency band from the input signal Si. Then, the extracted tone signal S2d is input into the power calculator 2e. The power calculator 2e squares the intensity of the signal S2d, so as to obtain the power thereof, as described above. The power signal S2e of the lower frequency group is output to the smoothing low-pass filter 2f. The power signal S2f which has passed through the smoothing low-pass filter 2f is output to the power adder 2g.

Figure 10:
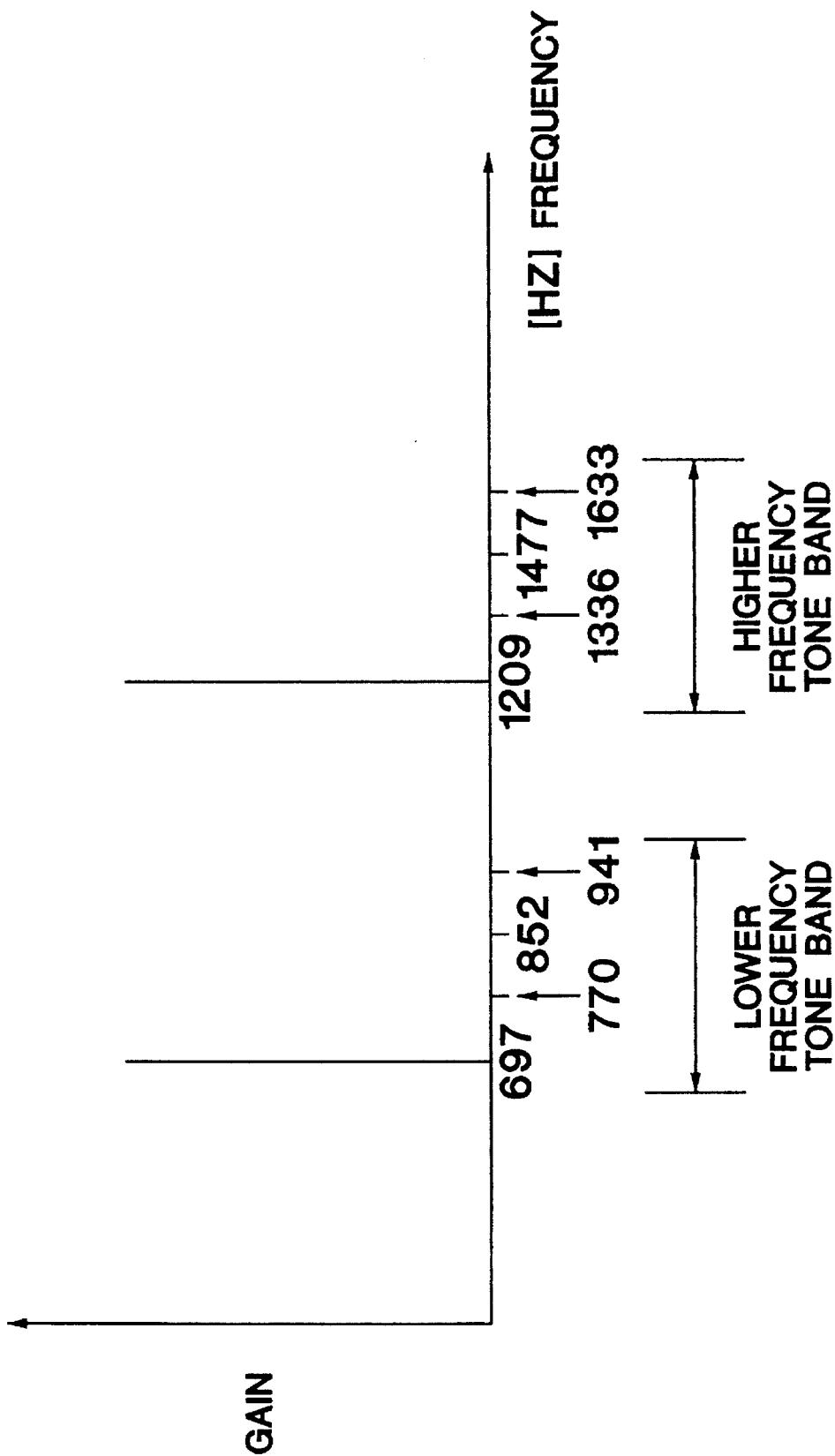
FIG. 10 shows an exemplary frequency spectrum of a DTMF signal.

In the power adder 2g, the power signals S2c and S2f are converted into digital signals, respectively. Then, the power adder 2g adds the value of the digitized power signal of the higher frequency group to the value of the digitized power signal of the lower frequency group, and outputs the added value as a power signal S2g having a value of the power of the signal in the DTMF detection frequency band to the power comparing and judging apparatus 3. The level of the tone signal of the higher frequency group is substantially equal to that of a tone signal of the lower frequency group (see FIG. 10). Accordingly, the sum of the power value is about twice as large as the level of the tone signal of the higher frequency group or of the lower frequency group. In the power adder 2g, the power signals S2c and S2f are not necessarily converted into digital signals. Alternatively, for example, the two signals may be added by an adding circuit constituted by an operational amplifier.

Assume that the value of the power signal S1b in the overall frequency band is $P_1$, and the value of the power signal S2g in the DTMF detection frequency band output from the power adder 2g is $P_2$. In the power comparing and judging apparatus 3, a difference $P_3$ between the values $P_1$ and $P_2$ is obtained as follows:

$$P_3 = P_1 - P_2$$

Then, the power comparing and judging apparatus 3 compares the calculated result $P_3$ with a predetermined threshold value.

If the calculated result $P_3$ is smaller than the predetermined threshold value, the output of power comparing and judging apparatus 3 becomes a high level or the power comparing and judging apparatus 3 outputs a value "1" of the binary number system. Based on the output at the high level or the output of "1", the input signal Si into the DTMF signal judging apparatus 4 is judged to be a DTMF signal. If the calculated result $P_3$ is larger than or equal to the predetermined threshold value, the output of the power comparing and judging apparatus 3 becomes a low level or the power comparing and judging apparatus 3 outputs a value "0" of the binary number system. Based on the output at the low level or the output of "0", the input signal Si sent to the DTMF signal judging apparatus 4 is judged not to be a DTMF signal. The output of the power comparing and judging apparatus 3 is sent to the next system (not shown) via the output terminal 7.

The next system which is connected to the DTMF signal judging apparatus 4 and the DTMF receiver 5 respectively via the output terminals 7 and 8 processes the input signal Si based on the judged result S3 indicating that the input signal Si input into the DTMF signal judging apparatus 4 is either a DTMF signal or not a DTMF signal.

Alternatively, the signal power calculator 2 for the DTMF detection frequency band may output a power signal having a smaller one of the values of the power signals of the higher frequency group and the lower frequency group. Furthermore, alternatively, the power comparing and judging apparatus 3 may obtain a ratio of the power value $P_1$ of the signal in the overall frequency band to the power value $P_2$ of the signal in the DTMF defection frequency band, and then compare the ratio with the threshold value.

Example 2

Figure 3:
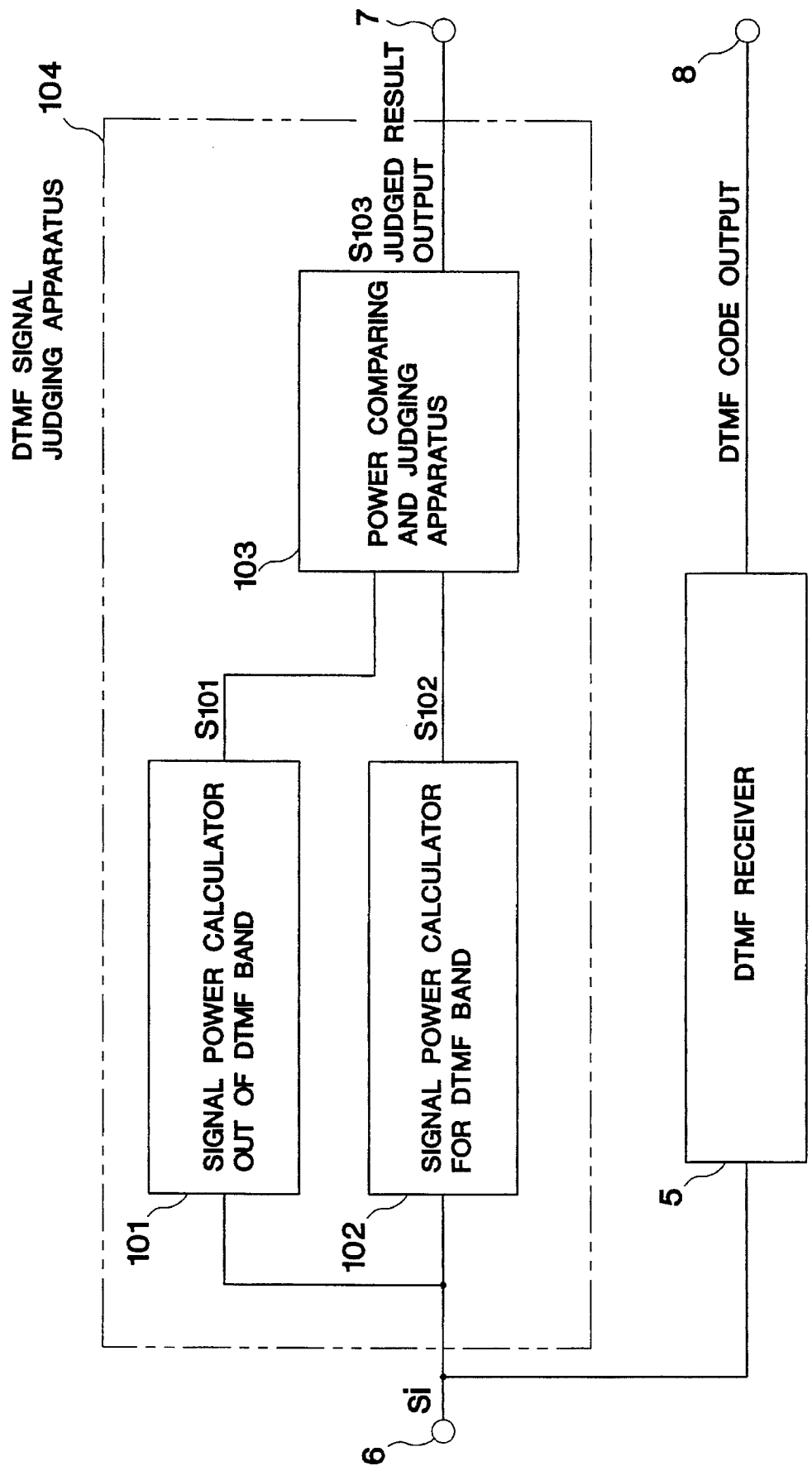
FIG. 3 is a block diagram showing a DTMF signal judging apparatus according to a second example of the invention.
Figure 4:
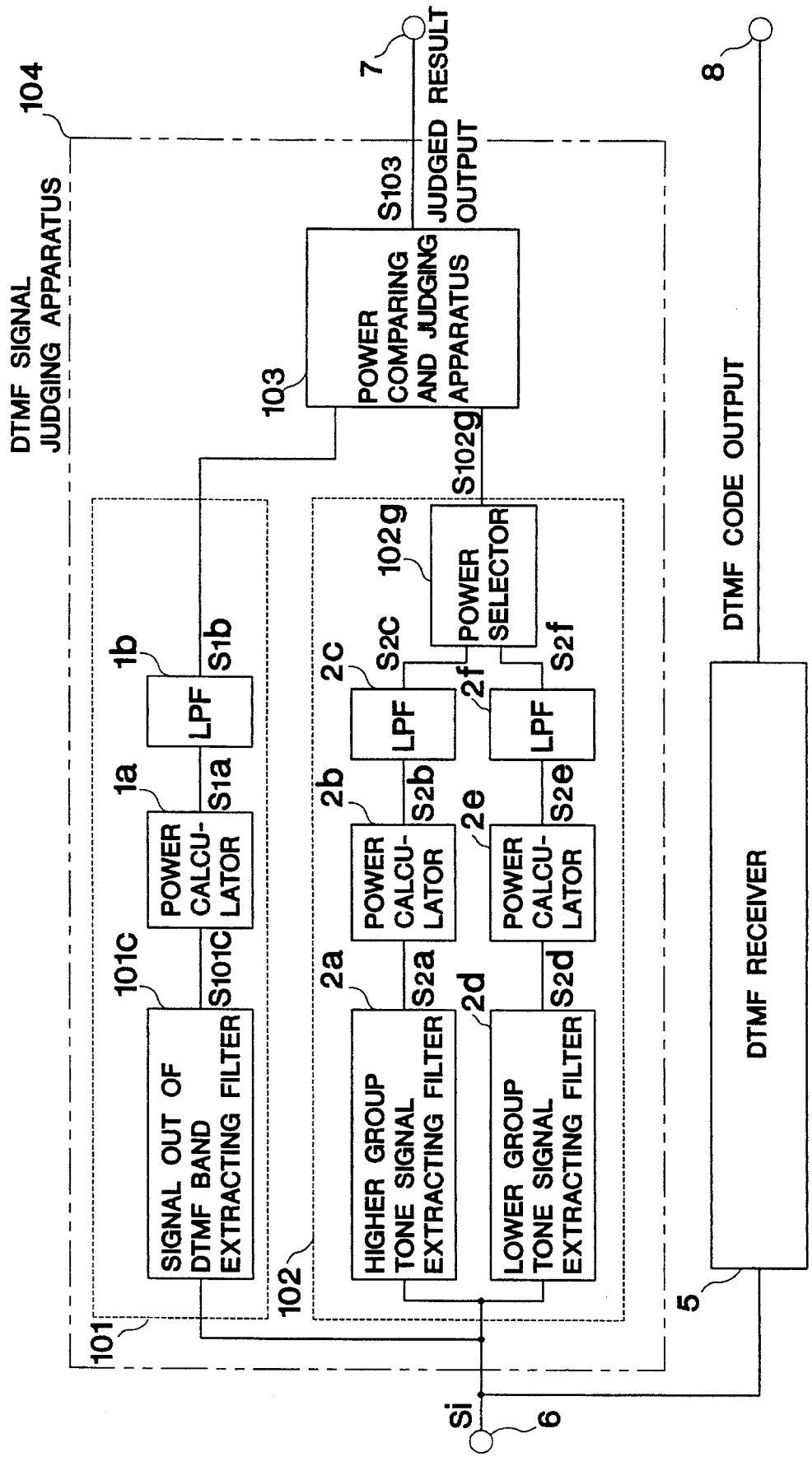
FIG. 4 is a block diagram showing the DTMF signal judging apparatus of FIG. 3 in detail.

A second example of the invention is described with reference to FIGS. 3 and 4. FIG. 3 is a block diagram showing a DTMF signal judging apparatus in the second example of the invention which is connected to a DTMF receiver. FIG. 3 is a block diagram showing the DTMF signal judging apparatus of FIG. 3 in detail.

A DTMF signal judging apparatus 104 in this example includes a signal power calculator 101 for a signal out of a DTMF detection frequency band, a signal power calculator 102 for a signal in the DTMF detection frequency band, and a power comparing and judging apparatus 103.

The signal power calculator 101 for the signal out of the DTMF detection frequency band includes a signal extracting filter 101c for extracting a signal out of the DTMF detection frequency band, a power calculator 1a and a smoothing low-pass filter 1b. The signal power calculator 102 for the signal in the DTMF detection frequency band includes a signal extracting filter 2a for extracting a tone signal in a higher frequency group, a signal extracting filter 2d for extracting a tone signal in a lower frequency group, power calculators 2b and 2e, smoothing low-pass filters 2c and 2f, and a power selector 102g.

As compared with the first example, in the signal power calculator 101, the signal extracting filter 101c is additionally connected between the power calculator 1a in the signal power calculator 1 and the input terminal 6. In the signal power calculator 102, the power selector 102g is provided instead of the power adder 2g in the signal power calculator 2.

An input terminal 6 of a DTMF receiver 5 is connected to the signal extracting filter 101c, the signal extracting filter 2a for the higher frequency group, and the signal extracting filter 2d for the lower frequency group. The outputs of the signal extracting filters 101c, 2a and 2d are connected to the power calculators 1a, 2b and 2e, respectively. The outputs of the power calculators 1a, 2b and 2e are connected to the corresponding smoothing low-pass filters 1b, 2c and 2f. The output of the smoothing low-pass filter 1b is connected to the power comparing and judging apparatus 103 as one input thereof. The outputs of the smoothing low-pass filters 2c and 2f are both connected to the power selector 102g. The output of the power selector 102g is connected to the power comparing and judging apparatus 103 as the other input thereof. The output of the power comparing and judging apparatus 103 is connected to an output terminal 7. The output of the DTMF receiver 5 is connected to an output terminal 8.

An input signal Si received at the input terminal 6 of the DTMF receiver 5 is then input into the signal extracting filters 101c, 2a and 2d, respectively.

The signal extracting filter 101c extracts the signal having a frequency out of the DTMF detection frequency band from the input signal Si. The extracted signal S101c is input into the power calculator 1a. The power calculator 1a squares the intensity of the signal S101c, so as to obtain the power thereof. A power signal S1a as the calculated result is output to the smoothing low-pass filter 1b. The power signal S1b which has passed through the smoothing low-pass filter 1b is output to the power comparing and judging apparatus 103 as a signal having a value of the power of the signal out of the DTMF detection frequency band of the input signal Si which is input into the DTMF signal judging apparatus 104.

The signal extracting filter 2a extracts a tone signal in the higher frequency group of the DTMF detection frequency band from the input signal Si. The extracted tone signal S2a is input into the power calculator 2b. The power calculator 2b squares the intensity of the signal S2a, so as to obtain the power thereof. A power signal S2b of the higher frequency group is output to the smoothing low-pass filter 2c. The power signal S2c which has passed through the smoothing low-pass filter 2c is input into the power selector 102g.

The signal extracting filter 2d extracts a tone signal in the lower frequency group of the DTMF detection frequency band from the input signal Si. Then, the extracted tone signal S2d is input into the power calculator 2e. The power calculator 2e squares the intensity of the signal S2d, so as to obtain the power thereof. A power signal S2e of the lower frequency group is output to the smoothing low-pass filter 2f. The power signal S2f which has passed through the smoothing low-pass filter 2f is output to the power selector 102g.

The power selector 102g outputs one of the power signals of the higher frequency group and the lower frequency group whichever has a smaller value, to the power comparing and judging apparatus 103 as a power signal S102g in the DTMF detection frequency band.

Assume that the value of the power signal S1b out of the DTMF detection frequency band is $P_1$, and the value of the power signal S102g in the DTMF detection frequency band output from the power selector 102g is $P_2$. In the power comparing and judging apparatus 103, a difference $P_3$ between the values $P_1$ and $P_2$ is obtained as follows:

$$P_3 = P_2 - P_1$$

Then, the power comparing and judging apparatus 103 compares the calculated result $P_3$ with a predetermined threshold value.

If the calculated result $P_3$ is larger than the predetermined threshold value, the output of power comparing and judging apparatus 103 becomes a high level or the power comparing and judging apparatus 103 outputs a value "1" of the binary number system. Based on the output at the high level or the output of "1", the input signal Si into the DTMF signal judging apparatus 104 is judged to be a DTMF signal.

If the calculated result $P_3$ is smaller than or equal to the predetermined threshold value, the output of the power comparing and judging apparatus 103 becomes a low level or the power comparing and judging apparatus 103 outputs a value "0" of the binary number system. Based on the output at the low level or the output of "0", the input signal Si into the DTMF signal judging apparatus 104 is judged not to be a DTMF signal.

The output S103 of the power comparing and judging apparatus 103 is output to a next system (not shown) via the output terminal 7.

The next system which is connected to the DTMF signal judging apparatus 104 and the DTMF receiver 5 respectively via the output terminals 7 and 8 processes the input signal Si based on the judged result S103 indicating that the input signal Si input into the DTMF signal judging apparatus 104 is either a DTMF signal or not a DTMF signal.

Alternatively, the signal power calculator 102 for a signal in the DTMF detection frequency band may output a power signal having a value obtained by adding the values of the power signals of the higher frequency group and the lower frequency group. Furthermore, alternatively, the power comparing and judging apparatus 103 may obtain a ratio of the power value $P_1$ of the signal out of the DTMF detection frequency band to the power value $P_2$ of the signal in the DTMF detection frequency band, and then compare the ratio with the threshold value.

Example 3

Figure 5:
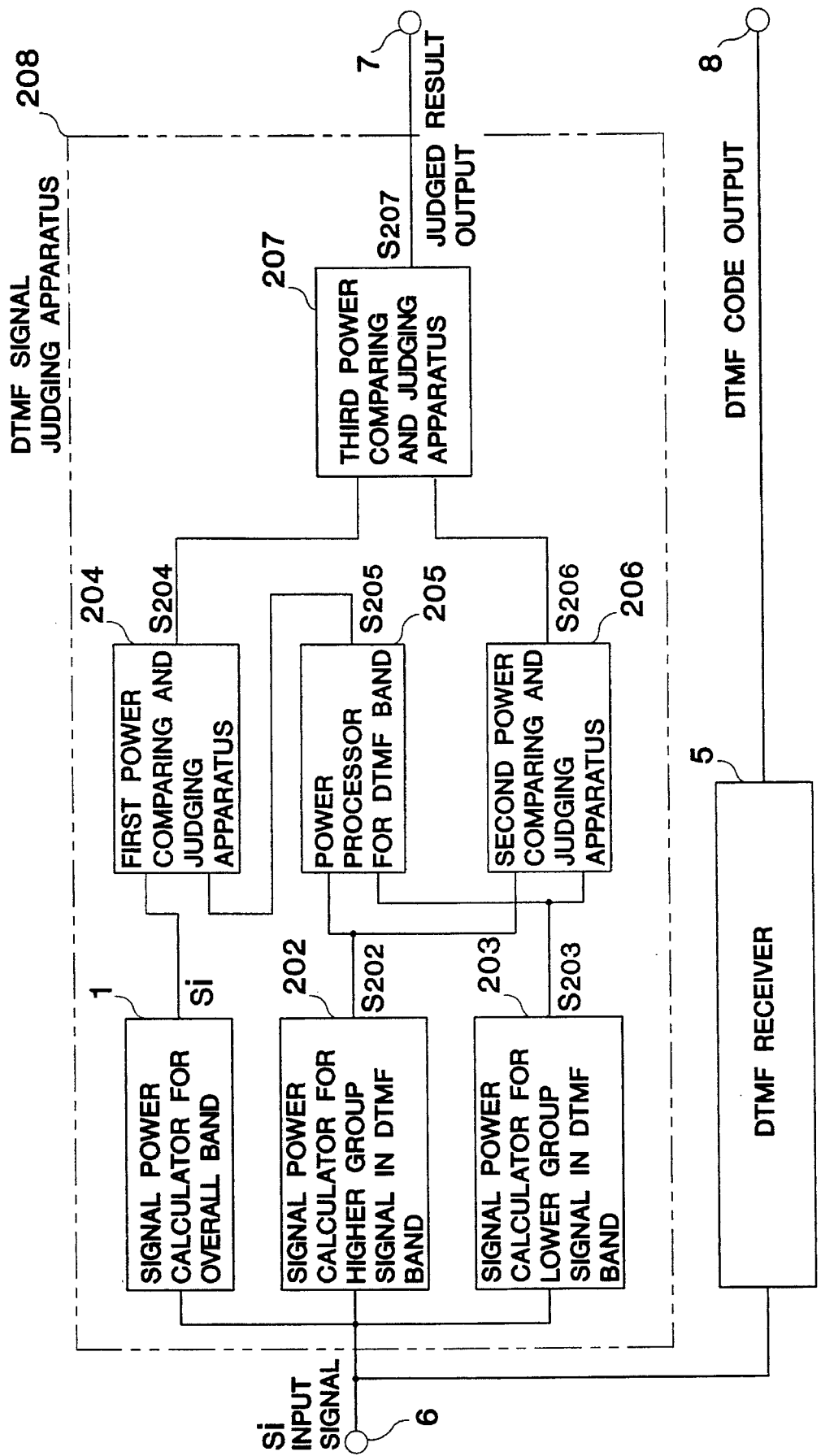
FIG. 5 is a block diagram showing a DTMF signal judging apparatus according to a third example of the invention.
Figure 6:
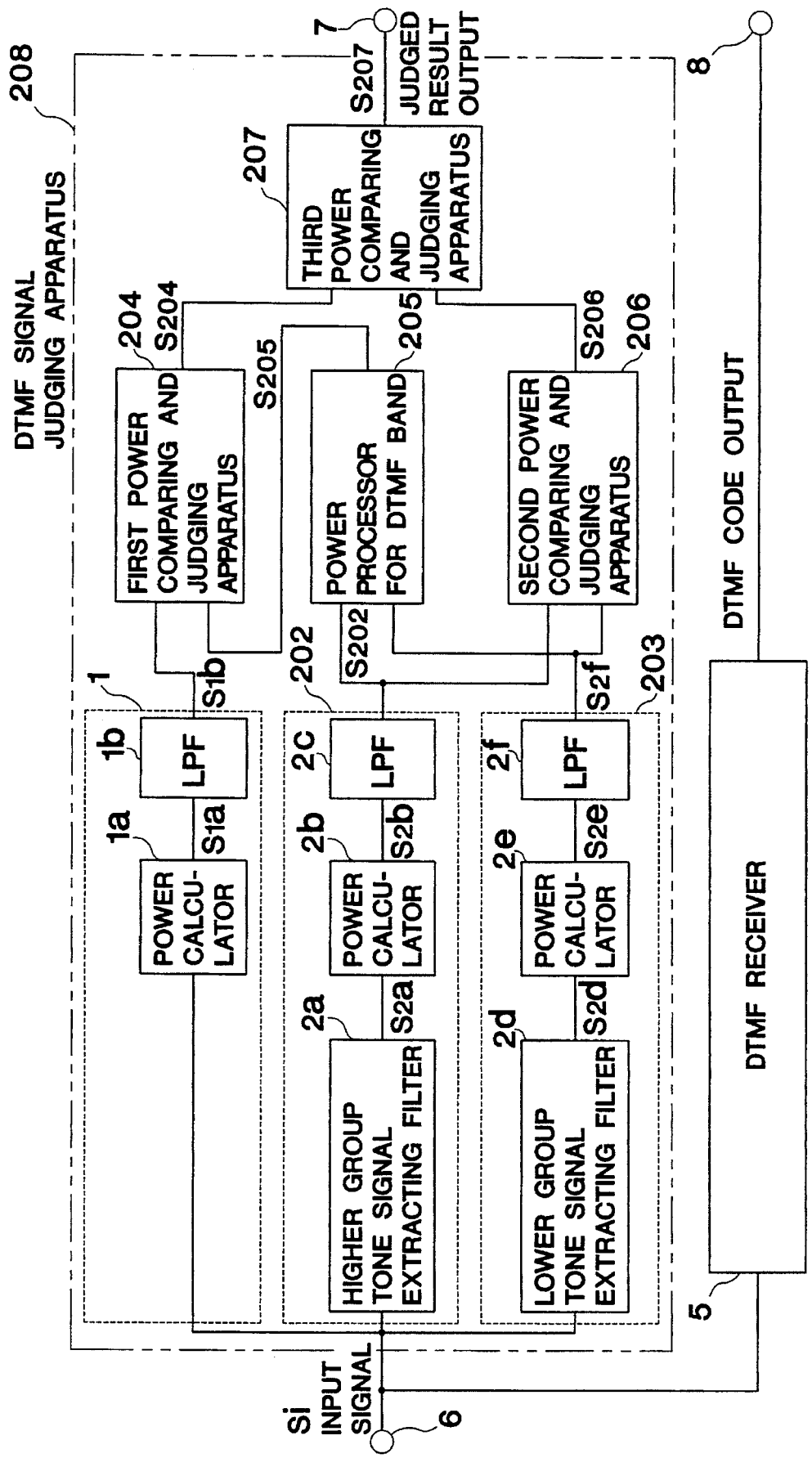
FIG. 6 is a block diagram showing the DTMF signal judging apparatus of FIG. 5 in detail.

A third example of the invention is described with reference to FIGS. 5 and 6. FIG. 5 is a block diagram showing a DTMF signal judging apparatus in the third example of the invention which is connected to a DTMF receiver. FIG. 6 is a block diagram showing the DTMF signal judging apparatus of FIG. 5 in detail.

A DTMF signal judging apparatus 208 in this example includes a signal power calculator 1 for a signal in the overall frequency band, a signal power calculator 202 for a signal in a higher frequency group of a DTMF detection frequency band, a signal power calculator 203 for a signal in a lower frequency group of the DTMF detection frequency band, a first power comparing and judging apparatus 204, a signal power processor 205 for a signal in the DTMF detection frequency band, a second power comparing and judging apparatus 206, and a third power comparing and judging apparatus 207.

The signal power calculator 1 for the overall frequency band includes a power calculator 1a and a smoothing low-pass filter 1b. The signal power calculator 202 for the higher frequency group includes a signal extracting filter 2a for extracting a tone signal in the higher frequency group, a power calculator 2b, and a smoothing low-pass filter 2c. The signal power calculator 203 for the lower frequency group includes a signal extracting filter 2d for extracting a tone signal in the lower frequency group, a power calculator 2e, and a smoothing low-pass filter 2f.

An input terminal 6 of a DTMF receiver 5 is connected to the power calculator 1a, the signal extracting filter 2a for the higher frequency group, and the signal extracting filter 2d for the lower frequency group. The outputs of the signal extracting filters 2a and 2d are connected to the power calculators 2b and 2e, respectively. The outputs of the power calculators 1a, 2b, and 2e are connected to the corresponding smoothing low-pass filters 1b, 2c, and 2f. The output of the smoothing low-pass filter 1b is connected to the first power comparing and judging apparatus 204 as one input thereof. The outputs of the smoothing low-pass filters 2c and 2f are both connected to the signal power processor 205 and the second power comparing and judging apparatus 206. The output of the signal power processor 205 is connected to the first power comparing and judging apparatus 204 as the other input thereof. The output of the first power comparing and judging apparatus 204 is connected to the third power comparing and judging apparatus 207 as one input thereof. The output of the second power comparing and judging apparatus 206 is connected to the third power comparing and judging apparatus 207 as the other input thereof. The output of the third power comparing and judging apparatus 207 is connected to an output terminal 7. The output of the DTMF receiver 5 is connected to another output terminal 8.

An input signal Si received at the input terminal 6 of the DTMF receiver 5 is then input into the power calculator 1a, and the signal extracting filters 2a and 2d, respectively.

The power calculator 1a squares the intensity of a signal in the overall frequency band of the input signal Si, so as to obtain the power of the signal. A power signal S1a as the calculated result is output to the smoothing low-pass filter 1b. The power signal S1b which has passed through the smoothing low-pass filter 1b is output to the first power comparing and judging apparatus 204 as a signal having a value of the power of the signal in the overall frequency band of the input signal Si which is input into the DTMF signal judging apparatus 208.

The signal extracting filter 2a extracts a tone signal in the higher frequency group of the DTMF detection frequency band from the input signal Si. The extracted tone signal S2a is input into the power calculator 2b. The power calculator 2b squares the intensity of the signal S2a, so as to obtain the power thereof. The power signal S2b of the higher frequency group is output to the smoothing low-pass filter 2c. The power signal S202 which has passed through the smoothing low-pass filter 2c is input into the signal power processor 205 and the second power comparing and judging apparatus 206.

The signal extracting filter 2d extracts a tone signal in the lower frequency group of the DTMF detection frequency band from the input signal Si. Then, the extracted tone signal S2d is input into the power calculator 2e. The power calculator 2e squares the intensity of the signal S2d, so as to obtain the power thereof. The power signal S2e of the lower frequency group is output to the smoothing low-pass filter 2f. The power signal S2f which has passed through the smoothing low-pass filter 2f is input into the signal power processor 205 and the second power comparing and judging apparatus 206.

In the signal power processor 205, the value of the power signal of the higher frequency group is added to the value of the power signal of the lower frequency group, and the added value is output to the first power comparing and judging apparatus 204 as a power signal S205 having a value of the power of the signal in the DTMF detection frequency band.

Assume that the value of the power signal S1b in the overall frequency band is $P_1$, and the value of the power signal S205 in the DTMF detection frequency band output from the signal power processor 205 is $P_2$. In the first power comparing and judging apparatus 204, a difference $P_3$ between the values $P_1$ and $P_2$ is obtained as follows:

$$P_3=P_1-P_2$$

Then, the first power comparing and judging apparatus 204 compares the calculated result $P_3$ with a predetermined threshold value.

If the calculated result $P_3$ is smaller than the predetermined threshold value, the output of the first power comparing and judging apparatus 204 becomes a high level or the first power comparing and judging apparatus 204 outputs a value "1" of the binary number system. Based on the output at the high level or the output of "1", the input signal Si into the DTMF signal judging apparatus 208 is judged to be a DTMF signal in the first power comparing and judging apparatus 204. If the calculated result $P_3$ is larger than or equal to the predetermined threshold value, the output of the first power comparing and judging apparatus 204 becomes a low level or the first power comparing and judging apparatus 204 outputs a value "0" of the binary number system. Based on the output at the low level or the output of "0", the input signal Si into the DTMF signal judging apparatus 208 is judged not to be a DTMF signal in the first power comparing and judging apparatus 204. The output S204 from the first power comparing and judging apparatus 204 is input to the third power comparing and judging apparatus 207.

Next, assume that the power value of the tone signal in the higher frequency group is $P_4$ and the power value of the tone signal in the lower frequency group is $P_5$. In the second power comparing and judging apparatus 206, an absolute value $P_6$ of the difference between the power values is as follows:

$$P_6=|P_4-P_5|$$

Then, the second power comparing and judging apparatus 206 compares the calculated result $P_6$ with a predetermined threshold value.

If the calculated result $P_6$ is smaller than the predetermined threshold value, the output of the second power comparing and judging apparatus 206 becomes a high level or the second power comparing and judging apparatus 206 outputs a value "1" of the binary number system. Based on the output at the high level or the output of "1", the input signal Si into the DTMF signal judging apparatus 208 is judged to be a DTMF signal in the second power comparing and judging apparatus 206. If the calculated result $P_6$ is larger than or equal to the predetermined threshold value, the output of the second power comparing and judging apparatus 206 becomes a low level or the second power comparing and judging apparatus 206 outputs a value "0" of the binary number system. Based on the output at the low level or the output of "0", the input signal Si into the DTMF signal judging apparatus 208 is judged not to be a DTMF signal in the second power comparing and judging apparatus 206. The output S206 from the second power comparing and judging apparatus 206 is input into the third power comparing and judging apparatus 207.

The third power comparing and judging apparatus 207 judges that the input signal Si into the DTMF signal judging apparatus 208 is a DTMF signal, when both the outputs S204 and S206 from the first and second power comparing and judging apparatus 204 and 206 indicate the value "1" or at the high level. In this case, the third power comparing and judging apparatus 207 outputs a value "1" of the binary number system or a signal at a high level.

On the other hand, when either one of or both of the outputs S204 and S206 from the first and second power comparing and judging apparatus 204 and 206 indicate the value "0" or at the low level, the third power comparing and judging apparatus 207 judges that the input signal Si into the DTMF signal judging apparatus 208 is not a DTMF signal. In this case, the third power comparing and judging apparatus 207 outputs a value "0" of the binary number system or a signal at a low level.

The output S207 from the third power comparing and judging apparatus 207 is output to the next system (not shown) via the output terminal 7. The next system which is connected to the DTMF signal judging apparatus 208 and the DTMF receiver 5 respectively via the output terminals 7 and 8 processes the input signal Si based on the judged result S207 indicating that the input signal Si input into the DTMF signal judging apparatus 208 is either a DTMF signal or not a DTMF signal.

Alternatively, the signal power processor 205 for a signal in the DTMF detection frequency band may output a power signal having the smaller one of the power values of the tone signals of the higher frequency group and the lower frequency group. Furthermore, alternatively, the first power comparing and judging apparatus 204 may obtain a ratio of the power value $P_1$ of the signal in the overall frequency band to the power value $P_2$ of the signal in the DTMF detection frequency band, and then compare the ratio with the threshold value. Alternatively, the second power comparing and judging apparatus 206 may obtain a ratio of the power value $P_4$ of the tone signal in the higher frequency band of the DTMF detection frequency band to the power value $P_5$ of the tone signal in the lower frequency band of the DTMF detection frequency band, and compare the ratio with the threshold value.

Example 4

Figure 7:
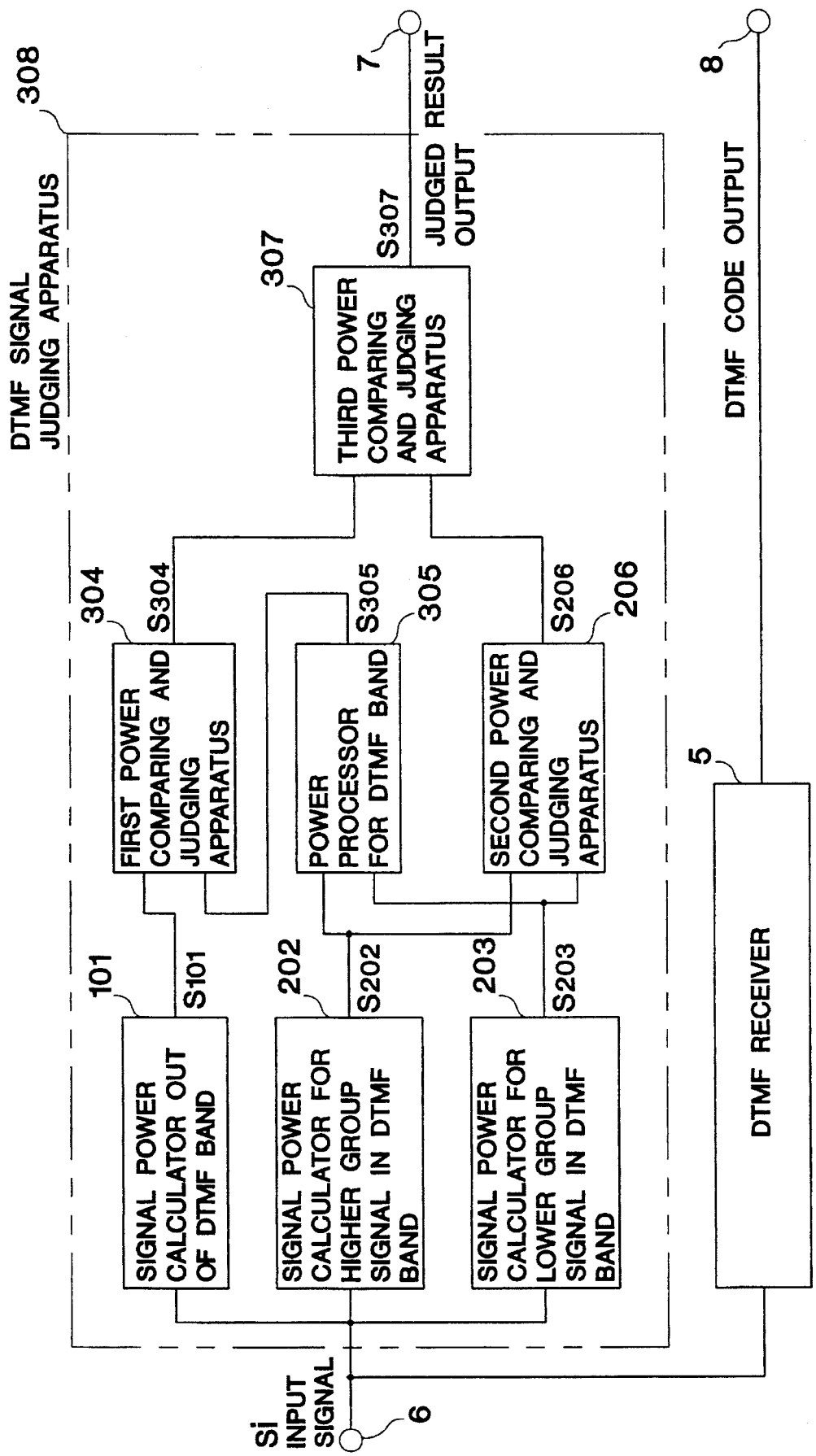
FIG. 7 is a block diagram showing a DTMF signal judging apparatus according to a fourth example of the invention.
Figure 8:
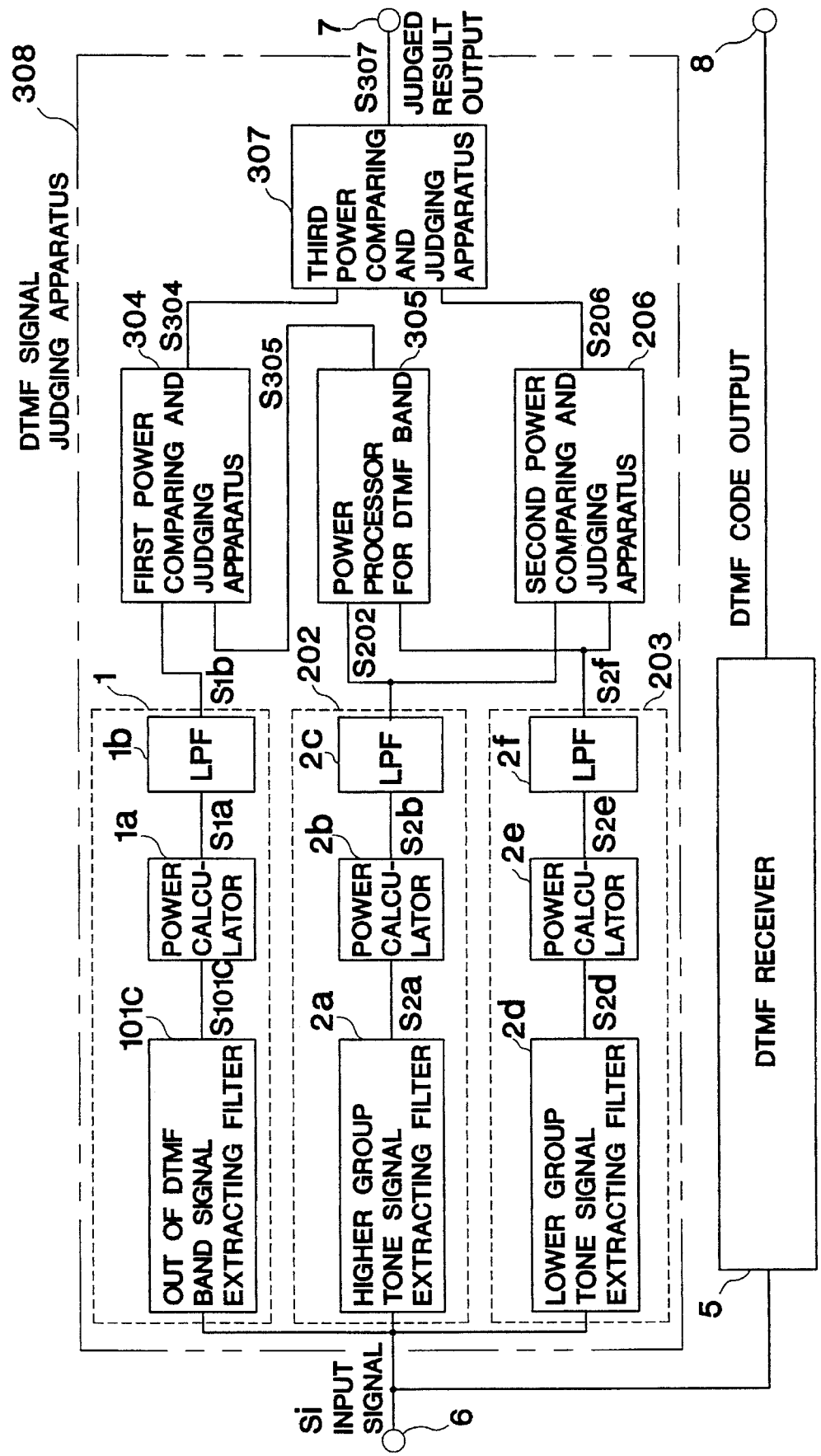
FIG. 8 is a block diagram showing the DTMF signal judging apparatus of FIG. 7 in detail.
Figure 9:
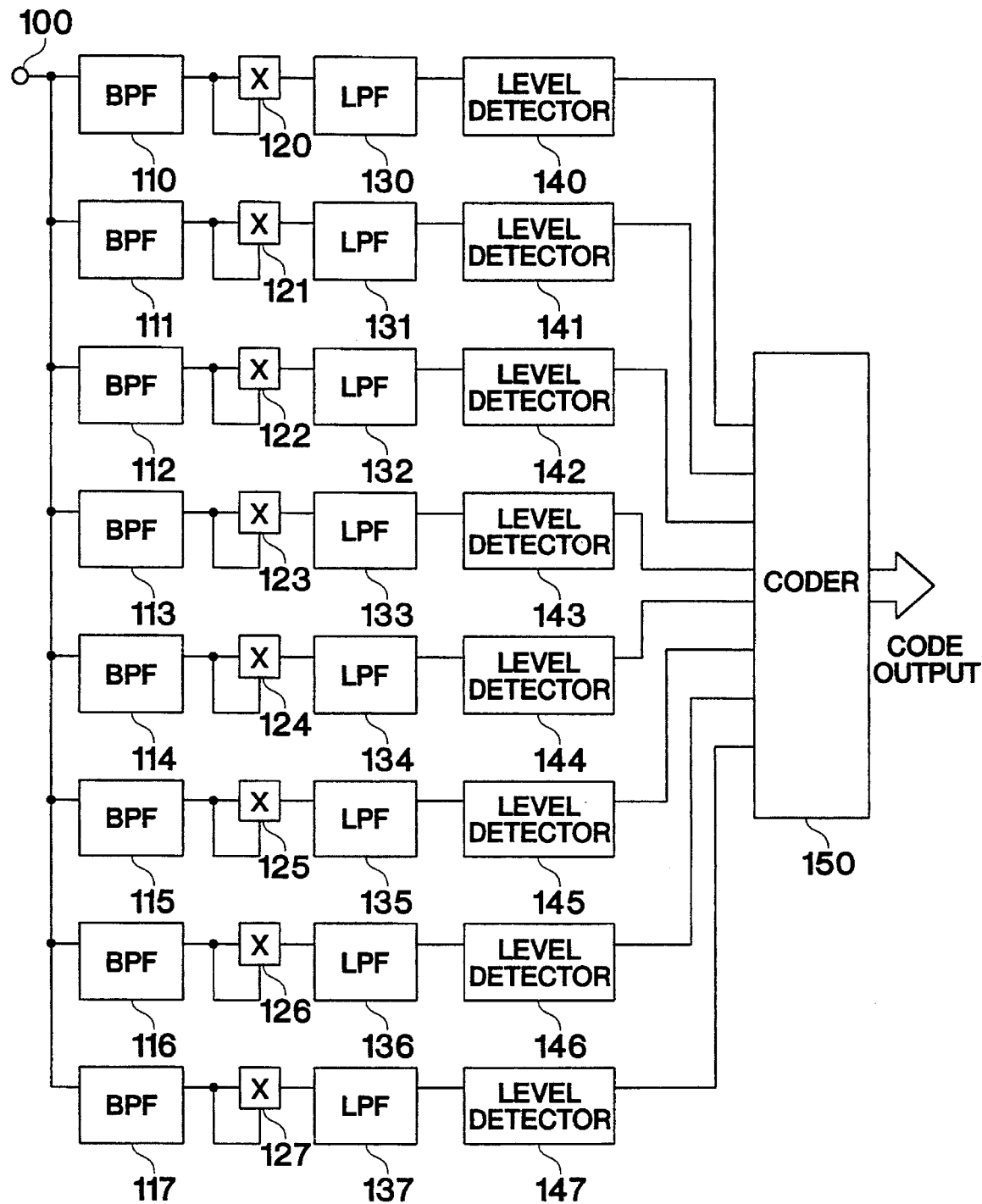
FIG. 9 is a block diagram showing a conventional DTMF receiver.

A fourth example of the invention is described with reference to FIGS. 7 and 8. FIG. 7 is a block diagram showing a DTMF signal judging apparatus in the fourth example of the invention which is connected to a DTMF receiver. FIG. 8 is a block diagram showing the DTMF signal judging apparatus of FIG. 7 in detail.

A DTMF signal judging apparatus 308 in this example includes a signal power calculator 101 for a signal out of a DTMF detection frequency band, a signal power calculator 202 for a signal in a higher frequency group of a DTMF detection frequency band, a signal power calculator 203 for a signal in a lower frequency group of the DTMF detection frequency band, a first power comparing and judging apparatus 304, a signal power processor 305 for a signal in the DTMF detection frequency band, a second power comparing and judging apparatus 206, and a third power comparing and judging apparatus 307.

The signal power calculator 101 for a signal out of the DTMF detection frequency band includes a signal extracting filter 101c for extracting a signal out of the DTMF detection frequency band, a power calculator 1a and a smoothing low-pass filter 1b. The signal power calculator 202 for the higher frequency group includes a signal extracting filter 2a for extracting a tone signal in the higher frequency group, a power calculator 2b, and a smoothing low-pass filter 2c. The signal power calculator 203 for the lower frequency group includes a signal extracting filter 2d for extracting a tone signal in the lower frequency group, a power calculator 2e, and a smoothing low-pass filter 2f.

As compared with the third example, in the signal power calculator 101, the signal extracting filter 101c is additionally connected between the power calculator 1a in the signal power calculator 1 and an input terminal 6.

The input terminal 6 of a DTMF receiver 5 is connected to the signal extracting filter 101c, the signal extracting filter 2a for the higher frequency group, and the signal extracting filter 2d for the lower frequency group. The outputs of the signal extracting filters 101c, 2a and 2d are connected to the power calculators 1a, 2b and 2e, respectively. The outputs of the power calculators 1a, 2b and 2e are connected to the corresponding smoothing low-pass filters 1b, 2c and 2f. The output of the smoothing low-pass filter 1b is connected to the first power comparing and judging apparatus 304 as one input thereof. The outputs of the smoothing low-pass filters 2c and 2f are both connected to the signal power processor 305 and the second power comparing and judging apparatus 206. The output of the power processor 305 is connected to the first power comparing and judging apparatus 304 as the other input thereof. The output of the first power comparing and judging apparatus 304 is connected to the third power comparing and judging apparatus 307 as one input thereof. The output of the second power comparing and judging apparatus 206 is connected to the third power comparing and judging apparatus 307 as the other input thereof. The output of the third power comparing and judging apparatus 307 is connected to an output terminal 7. The output of the DTMF receiver 5 is connected to another output terminal 8.

An input signal Si received at the input terminal 6 of the DTMF receiver 5 is then input into the signal extracting filters 101c, 2a and 2d, respectively.

The signal extracting filter 101c extracts a signal having a frequency out of the DTMF detection frequency band from the input signal Si. The extracted signal S101c is input into the power calculator 1a. The power calculator 1a squares the intensity of the signal S101c so as to obtain the power thereof. A power signal S1a, as the calculated result, is output to the smoothing low-pass filter 1b. The power signal S1b which has passed through the smoothing low-pass filter 1b is output to the first power comparing and judging apparatus 304 as a signal having a value of the power of the signal out of the DTMF detection frequency band in the input signal Si which is input into the DTMF signal judging apparatus 308.

The signal extracting filter 2a extracts a tone signal in the higher frequency group of the DTMF detection frequency band from the input signal Si. The extracted tone signal S2a is input into the power calculator 2b. The power calculator 2b squares the intensity of the signal S2a, so as to obtain the power thereof. The power signal S2b of the higher frequency group is output to the smoothing low-pass filter 2c. The power signal S2c which has passed through the smoothing low-pass filter 2c is input into the signal power processor 305 and the second power comparing and judging apparatus 206.

The signal extracting filter 2d extracts a tone signal in the lower frequency group of the DTMF detection frequency band from the input signal Si. Then, the extracted tone signal S2d is input into the power calculator 2e. The power calculator 2e squares the intensity of the signal S2d, so as to obtain the power thereof. The power signal S2e of the lower frequency group is output to the smoothing low-pass filter 2f. The power signal S2f which has passed through the smoothing low-pass filter 2f is input into the signal power processor 305 and the second power comparing and judging apparatus 206.

The signal power processor 305 outputs one of the tone signals of the higher frequency group and the lower frequency group whichever has a smaller power value to the first power comparing and judging apparatus 304 as a power signal S305 having a value of the power of the signal in the DTMF detection frequency band.

Assume that the value of the power signal S1b out of the DTMF detection frequency band is $P_1$, and the value of the power signal S305 in the DTMF detection frequency band output from the signal power processor 305 is $P_2$. In the first power comparing and judging apparatus 304, a difference $P_3$ between the values $P_1$ and $P_2$ is obtained as follows:

$$P_3 = P_2 - P_1$$

Then, the first power comparing and judging apparatus 304 compares the calculated result $P_3$ with a predetermined threshold value.

If the calculated result $P_3$ is larger than the predetermined threshold value, the output of the first power comparing and judging apparatus 304 becomes a high level or the first power comparing and judging apparatus 304 outputs a value "1" of the binary number system. Based on the output at the high level or the output of "1", the input signal Si into the DTMF signal judging apparatus 308 is judged to be a DTMF signal in the first power comparing and judging apparatus 304. If the calculated result $P_3$ is smaller than or equal to the predetermined threshold value, the output of the first power comparing and judging apparatus 304 becomes a low level or the first power comparing and judging apparatus 304 outputs a value "0" of the binary number system. Based on the output at the low level or the output of "0", the input signal Si into the DTMF signal judging apparatus 308 is judged not to be a DTMF signal in the first power comparing and judging apparatus 304. The output S304 from the first power comparing and judging apparatus 304 is input to the third power comparing and judging apparatus 307.

Next, assume that the power value of the tone signal in the higher frequency group is $P_4$ and the power value of the tone signal in the lower frequency group is $P_5$. In the second power comparing and judging apparatus 206, an absolute value $P_6$ of the difference between the power values as follows:

$$P_6 = |P_4 - P_5|$$

Then, the second power comparing and judging apparatus 206 compares the calculated result $P_6$ with a predetermined threshold value.

If the calculated result $P_6$ is smaller than the predetermined threshold value, the output of the second power comparing and judging apparatus 206 becomes a high level or the second power comparing and judging apparatus 206 outputs a value "1" of the binary number system. Based on the output at the high level or the output of "1", the input signal Si into the DTMF signal judging apparatus 308 is judged to be a DTMF signal in the second power comparing and judging apparatus 206. If the calculated result $P_6$ is larger than or equal to the predetermined threshold value, the output of the second power comparing and judging apparatus 206 becomes a low level or the second power comparing and judging apparatus 206 outputs a value "0" of the binary number system. Based on the output at the low level or the output of "0", the input signal Si into the DTMF signal judging apparatus 308 is judged not to be a DTMF signal in the second power comparing and judging apparatus 206. The output S206 from the second power comparing and judging apparatus 206 is input into the third power comparing and judging apparatus 307.

The third power comparing and judging apparatus 307 judges whether the input signal Si into the DTMF signal judging apparatus 308 is a DTMF signal, when both the outputs S304 and S206 from the first and second power comparing and judging apparatus 304 and 206 indicate the value "1" or at the high level. In this case, the third power comparing and judging apparatus 307 outputs a value "1" of the binary number system or a signal at a high level.

On the other hand, when either one of or both of the outputs S304 and S206 from the first and second power comparing and judging apparatus 304 and 206 indicate the value "0" or at the low level, the third power comparing and judging apparatus 307 judges that the input signal Si into the DTMF signal judging apparatus 308 is not a DTMF signal. In this case, the third power comparing and judging apparatus 307 outputs a value "0" of the binary number system or a signal at a low level.

The output S307 from the third power comparing and judging apparatus 307 is output to a next system (not shown) via the output terminal 7. The next system which is connected to the DTMF signal judging apparatus 308 and the DTMF receiver 5 respectively via the output terminals 7 and 8 processes the input signal Si based on the judged result S307 indicating that the input signal Si input into the DTMF signal judging apparatus 308 is either a DTMF signal or not a DTMF signal.

Alternatively, the signal power processor 305 for signals in the DTMF detection frequency band may output a power signal having a value obtained by adding the power values of the tone signals of the higher frequency group and the lower frequency group. Furthermore, alternatively, the first power comparing and judging apparatus 304 may obtain a ratio of the power value $P_1$ of the signal out of the DTMF detection frequency band to the power value $P_2$ of the signal in the DTMF detection frequency band, and then compare the ratio with the threshold value. Alternatively, the second power comparing and judging apparatus 206 may obtain a ratio of the power value $P_4$ of the tone signal in the higher frequency band of the DTMF detection frequency band to the power value $P_5$ of the tone signal in the lower frequency band of the DTMF detection frequency band, and compare the ratio with the threshold value.

By using a DTMF receiver with a DTMF signal judging apparatus according to the invention, a system with the DTMF receiver as a whole is remarkably improved in anti-noise characteristics and the voice excludability.

As a more specific example, a case where a user of the system with the DTMF receiver controls a device such as an ordinary telephone or a controller by sending a DTMF signal from a noisy station, such as from a public telephone station is described. If the device is equipped with the DTMF receiver, it is unnecessary for the user to cover the transmitter in order to prevent the device from being erroneously operated by a noise. Moreover, even when a device with a DTMF control function is connected to a telephone line having a high noise level such as an international line or a private line, an additional and special apparatus such as a noise filter for attaining a normal DTMF receiving operation is not required by using the DTMF receiver.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A DTMF signal judging apparatus comprising:

first means for calculating power of a signal in a certain frequency band of an input signal, the input signal having a frequency band which includes frequencies inside a DTMF detection frequency band and outside the DTMF detection frequency band;

second means for extracting a signal having a frequency in the DTMF detection frequency band from the input signal, and for calculating power of the extracted signal; and third means for performing an operation for the signals output from the first and second means, for comparing the operation result with a first predetermined threshold value, and for outputting the compared result.

2. A DTMF signal judging apparatus according to claim 1, wherein the first means comprises: a first calculator for calculating the power of the signal in the certain frequency band of the input signal; and a first low-pass filter for passing a lower frequency signal of the signal output from the first calculator.

3. A DTMF signal judging apparatus according to claim 1, wherein the certain frequency band is a frequency band out of the DTMF detection frequency band, and the first means extracts a signal having a frequency out of the DTMF detection frequency band from the input signal and calculates the power of the extracted signal.

4. A DTMF signal judging apparatus according to claim 1, wherein the first means comprises:

a first filter for extracting a signal having a frequency out of the DTMF detection frequency band from the input signal;

a first calculator for calculating the power of the signal output from the first filter; and a first low-pass filter for passing a lower frequency signal of the signal output from the first calculator.

5. A DTMF signal judging apparatus according to claim 1, wherein the second means comprises:

a second filter for extracting a tone signal of a higher frequency group from the input signal;

a second calculator for calculating the power of the signal output from the second filter;

a second low-pass filter for passing a lower frequency signal of the signal output from the second calculator;

a third filter for extracting a tone signal of a lower frequency group from the input signal;

a third calculator for calculating the power of the signal output from the third filter;

a third low-pass filter for passing a lower frequency signal of the signal output from the third calculator; and a power selector for selecting one of the signals output from the second and third low-pass filters.

6. A DTMF signal judging apparatus according to claim 1, wherein the certain frequency band is a frequency band out of the DTMF detection frequency band, the first means extracts a signal having a frequency out of the DTMF detection frequency band from the input signal and calculates the power of the extracted signal, and the second means comprises:

fourth means for extracting a signal having a frequency in a higher frequency group of the DTMF detection frequency band from the input signal and for calculating the power of the extracted signal; and fifth means for extracting a signal having a frequency in a lower frequency group of the DTMF detection frequency band from the input signal and for calculating the power of the extracted signal.

7. A DTMF signal judging apparatus according to claim 6, wherein the first means comprises:

a first filter for extracting a signal having a frequency out of the DTMF detection frequency band from the input signal;

a first calculator for calculating the power of the signal output from the first filter; and a first low-pass filter for passing a lower frequency signal of the signal output from the first calculator.

8. A DTMF signal judging apparatus according to claim 6, wherein the fourth means comprises:

a second filter for extracting a tone signal belonging to a higher frequency group from the input signal;

a second calculator for calculating the power of the signal output from the second filter; and a second low-pass filter for passing a lower frequency signal of the signal output from the second calculator.

9. A DTMF signal judging apparatus according to claim 6, wherein the fifth means comprises:

a third filter for extracting a tone signal belonging to a lower frequency group from the input signal;

a third calculator for calculating the power of the signal output from the third filter; and a third low-pass filter for passing a lower frequency signal of the signal output from the third calculator.

10. A DTMF signal judging apparatus according to claim 6, wherein said third means includes, sixth means for receiving output signals from said fourth and fifth means, for performing an operation for the output signals from said fourth and fifth means, and for outputting the performed result, seventh means for performing an operation for output signals from said first means and said sixth means, for comparing the operation result with a second predetermined threshold value, and for outputting the compared result; and said DTMF signal judging apparatus further comprises, eighth means for performing an operation for output signals from said fourth means and said fifth means, for comparing the operation result with a third predetermined threshold value, and for outputting the compared result, and ninth means for performing an operation for output signals from said seventh and eighth means, and for outputting a result based thereon.

11. A DTMF signal judging apparatus according to claim 1, wherein said DTMF signal apparatus is in a telephone.

12. A DTMF signal judging apparatus according to claim 1, wherein said DTMF signal apparatus is in a facsimile machine.

* * * * *